United States Patent [19]

Itoh

[11] Patent Number: 5,574,533
[45] Date of Patent: Nov. 12, 1996

[54] LABORATORY SYSTEM

[75] Inventor: Takeyoshi Itoh, Asaka, Japan

[73] Assignee: Fuji Photo Film Co., Ltd., Kanagawa, Japan

[21] Appl. No.: 450,008

[22] Filed: May 25, 1995

[30] Foreign Application Priority Data

Jun. 30, 1994 [JP] Japan .................................. 6-149477

[51] Int. Cl.⁶ .................................................. G03D 13/02
[52] U.S. Cl. ............................................ 396/639; 396/567
[58] Field of Search ............................... 354/289.1, 106, 354/430, 334, 298; 358/487; 348/97; 340/723; 235/487; 250/327.2

[56] References Cited

U.S. PATENT DOCUMENTS

| | | | |
|---|---|---|---|
| 4,728,978 | 3/1988 | Inoue et al. | 354/289.1 |
| 4,884,092 | 11/1989 | Inoue et al. | 354/289.1 |
| 4,887,115 | 12/1989 | Inoue et al. | 354/289.1 |
| 4,891,634 | 1/1990 | Ina et al. | 340/723 |
| 4,904,853 | 2/1990 | Yokokawa | 235/487 |
| 5,036,344 | 7/1991 | Inoue et al. | 354/106 |
| 5,101,286 | 3/1992 | Patton | 358/487 |
| 5,134,434 | 7/1992 | Inoue et al. | 354/430 |
| 5,237,358 | 8/1993 | Yamada et al. | 354/298 |
| 5,309,242 | 5/1994 | Asami et al. | 348/97 |
| 5,432,580 | 7/1995 | Tokuda | 354/298 |
| 5,444,482 | 8/1995 | Misawa et al. | 358/335 X |

FOREIGN PATENT DOCUMENTS

| | | |
|---|---|---|
| 62-208028 | 9/1987 | Japan . |
| 5-56345 | 3/1993 | Japan . |
| WO9004301 | 4/1990 | WIPO . |

*Primary Examiner*—D. Rutledge

[57] ABSTRACT

Digital image data which is transmitted from a film scanner to a digital printer is used, and the digital image data is written in an outer storage medium such as an IC card, a floppy disk, etc. in accordance with a user's requirement for the digital image data, so that the outer storage medium can be returned to the user. As a result, the user can obtain the digital image data, which is made by a high-performance film scanner in a laboratory, at a low cost, and enjoy the film image by a player and a personal computer which regenerate the digital image data. Moreover, he can easily get prints of the digital image data, which has been image-processed by the personal computer, etc., at a low cost.

20 Claims, 1 Drawing Sheet

LABORATORY SYSTEM

BACKGROUND OF THE INVENTION

1. Field of the Invention

The present invention relates to a laboratory system and more particularly to a laboratory system which can exchange information with a player and a camera.

2. Description of the Related Art

Conventionally, a film player, which picks up an image on a developed still photographic film with an image sensor such as a CCD, etc., and converts the image on the photographic film into image signals, and outputs image signals to a TV monitor so as to display a film image, is represented by WO90/04301 and Japanese Patent Application Laid-open No. 5-56345.

A data record camera is also proposed which records information relating to photographing, a print order, etc. in an IC card mounted in a camera (Japanese Patent Application Laid-open No. 62-208028). The IC card, in which predetermined information is recorded by the data record camera, is sent together with a corresponding film to a laboratory via a development agency, so that necessary information for development can be delivered. And, an information relating to the processing in the laboratory, the number of prints, etc. is recorded in the IC card so that such information can be returned to camera users.

However, the film player should be of a high-performance type in order to provide the digital image data of a high quality image, therefore, the film player is expensive. And, when the high-quality photograph is obtained from the high quality digital image data, an expensive digital printer is required.

On the other hand, the information which the laboratory exchanges with the user by using the conventional IC card is only used in the laboratory.

SUMMARY OF THE INVENTION

The present invention has been developed in view of the above-mentioned circumstances and has as its aim the provision of a laboratory system wherein the user can get the digital image data of a high image quality at a low cost, and which can print the image data, which has been image-processed by a personal computer, etc., at a low cost.

To achieve the above-described object, the laboratory system of the present invention comprises a pre-processing part which picks up an image on a film, which is developed by a developing device or has already been developed, to convert it into digital image data, a digital printer which prints a film image in accordance with the digital image data from the pre-processing part, a writing device which writes the data in an outer storage medium, and a reader which reads the data from the outer storage medium, characterized in that the digital image data transmitted from the image reading apparatus is written in the outer storage medium by the writing device.

According to the present invention, the laboratory system uses the digital image data, which is transmitted from the image reading apparatus to the digital printer, and writes the digital image data in the outer storage medium such as an IC memory card, a floppy disk, etc. in accordance with requirements from the user for the digital image data, so that the outer storage medium can be returned to the user. As a result, the user can get the digital image data, which is produced by the high-performance image reading apparatus in the laboratory at a low cost, and he can also enjoy the high quality film image using a player, personal computer, etc. which regenerates the digital image data. Furthermore, he can easily get the digital image data which is image-processed by a personal computer, etc.

BRIEF DESCRIPTION OF THE DRAWINGS

The exact nature of this invention, as well as other objects and advantages thereof, will be readily apparent from consideration of the following specification relating to the accompanying drawing which is given by way of illustration only and thus is not limitative and wherein:

FIG. 1 is an explanatory view showing a delivery of the film cartridge and the IC memory card among the laboratory system according to the present invention, a camera, a player, a personal computer and the like.

DESCRIPTION OF THE PREFERRED EMBODIMENT

Figure 1:
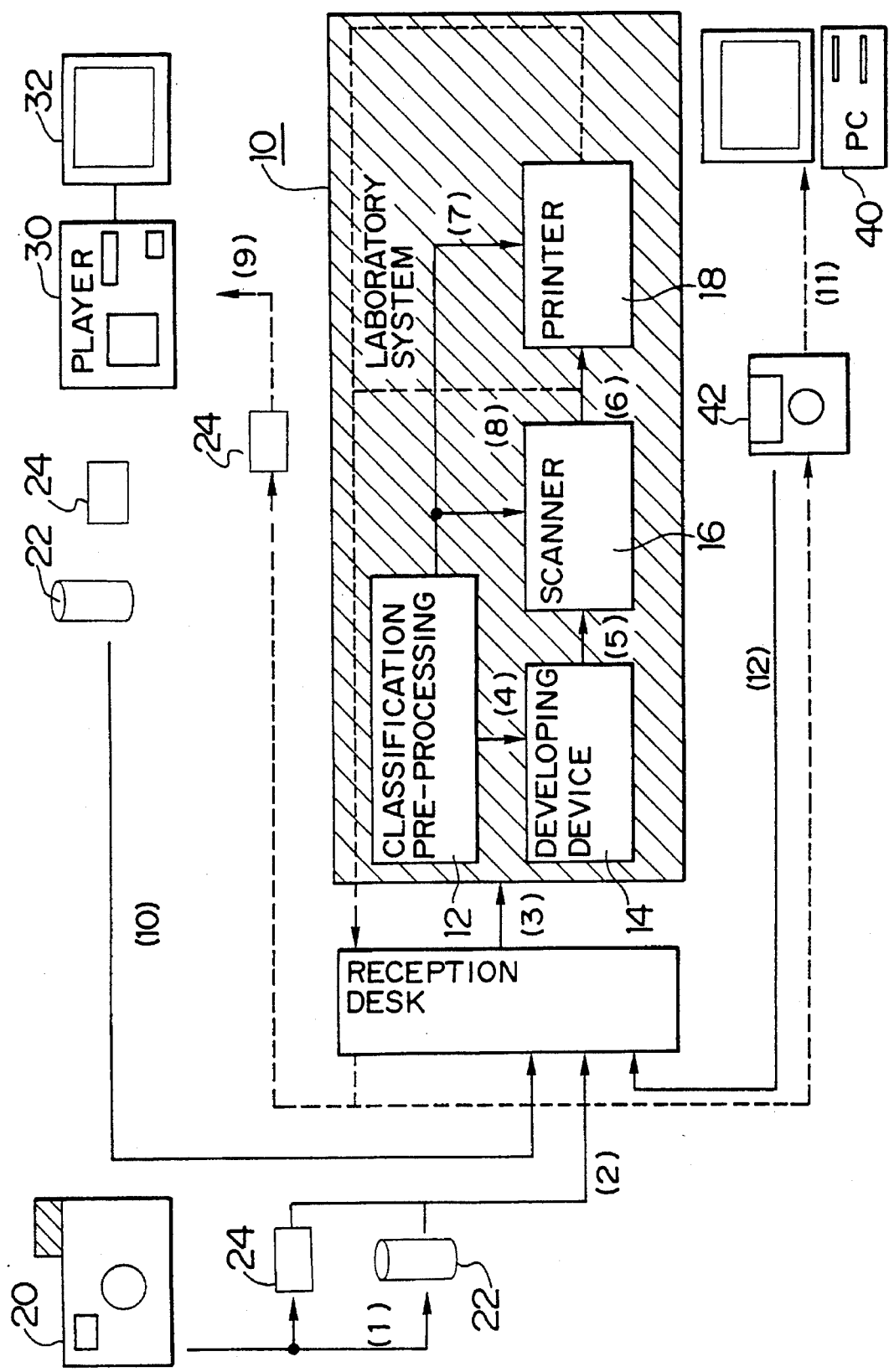

A detailed description will hereunder be given of the preferred embodiment of a laboratory system according to the present invention with reference to the accompanying drawing.

FIG. 1 is an explanatory view showing a delivery of the film cartridge and the IC memory card among the laboratory system according to the present invention, the camera, the player, the personal computer and the like.

In FIG. 1, 10 is a laboratory system, 20 is a camera, 30 is a player, and 40 is a personal computer.

A film cartridge 22 and IC memory card 24 can be mounted in a camera 20. The camera 20 picks up and records an object image on a film in the film cartridge 22, and records information concerning the photographing (the information pertaining to color temperature, exposure, overexposure and underexposure, the date of photographing, the size of a print, etc.) and an order information (the information pertaining to the number of prints, trimming, zooming, letters, etc.) in the memory card 24 (flow line (1)). The order information can be recorded by the player 30, too, as described later. After the photographing, the film cartridge 22 and the IC memory card 24 are received at the reception desk in a development agency (flow line (2)). From the reception desk, the film cartridge 22 and the IC memory card 24 are delivered to the laboratory system 10 after a predetermined processing (flow line (3)).

The laboratory system 10 comprises a pre-processing part 12, a developing device 14, a film scanner 16 and a digital printer 18. The pre-processing part 12 has a reading part which reads different kinds of information which are stored in the IC memory card 24, and carries out the classification of the film cartridge 22 (classification according to such instructions as simultaneous printing, development only, the number of prints made for a given frame, etc.) in accordance with the read information. And, it sends the necessary information (information pertaining to color temperature, exposure, and overexposure and underexposure) to the developing device 14 (flow line (4)).

The development apparatus 14 automatically develops the film in the film cartridge 22 in accordance with the development information, which is provided by the pre-processing part 12. Then, the developed film is sent to a film scanner 16 (flow line (5)). The film scanner 16 picks up the image on the film to convert it into digital image data, and then sends the digital image data to the digital printer 18 at the next stage (flow line (6)). And, the digital printer 18 produces a photograph from the input digital image data. Incidentally, the film scanner 16 and the digital printer 18 are controlled in accordance with the order information, which is read by the pre-processing part 12.

The photograph, which has been printed by the digital printer 18, is handed over to the user at the reception desk (flow line (7)). The film cartridge 22 and the IC memory card 24 are returned to the user as well as the photograph.

The laboratory system 10 provides a service of recording the required digital image data in the IC memory card 24. There are considered the digital image data which indicates the index screen for all frames of one film and the digital image data which indicates a full screen of a designated frame.

In the laboratory system 10, when the above-mentioned requirement for the service is included in order information, the digital image data, which is made by the film scanner 16, is written in the IC memory card 24. That is, the film scanner 16 has a data record part, which writes the digital image data in the IC memory card 24. When there is the requirement for the digital image data, the pre-processing part 12 makes the film scanner 16 write the digital image data in the IC memory card 24. Then, the IC memory card 24 which has the digital image data is handed over to the user at the reception desk (flow line (8)).

The player 30 receives the digital image data from the IC memory card 24 (flow line (9)), and records the required data in the IC memory card 24. It can display the image on the monitor TV 32 in accordance with the digital image data provided by the IC memory card. That is, the user can regenerate the digital image data, which is recorded in the IC memory card given by the laboratory system 10, so as to enjoy the image.

And, the player 30 displays an index screen on the monitor TV 32, and the user can designate desired frames, the number of prints, the size of a print, etc. while monitoring the index screen, thereby recording the order information in the IC memory card 24. Therefore, when the user instructs the number of prints desired for a given frame, he only needs to bring the film cartridge 22 and the IC memory card 24 to the reception desk at the development agency (flow line (10)).

On the other hand, the digital image data can be recorded in a floppy disk 42 used in the personal computer, instead of the IC memory card 24. In this case, the digital image data is written in accordance with a format designated by the user.

In this case (flow line (11)), he can regenerate the digital image data with the personal computer 40, and carry out the image-editing and the like. Furthermore, he writes the digital image data, which has been image-processed by the personal computer 40, in the floppy disk 42 so as to order prints (flow line (12)). That is, when there is an order to print the film image from digital image data stored in the floppy disk 42, the pre-processing part 12 can make the digital printer carry out the printing in accordance with the digital image data stored in the floppy disk 42.

The above-described service is provided by using the high-performance film scanner 16 of the laboratory system 10, so the user is able to obtain the reasonable high quality digital image data without paying a fee.

In WO90/04301, a camera and a film player are disclosed which uses a photographic film with a magnetic record layer, and wherein different kinds of information pertaining to each frame can be recorded in the magnetic record layer which corresponds to each frame. Therefore, if the film is used, information concerning photographing and order in each frame can be transmitted to the laboratory system 10 by the film instead of the IC memory card 24.

Furthermore, by using the film, the exposure condition for development is magnetically recorded in the magnetic record layer of the film in the development apparatus 14. And, at the time of re-printing, the pre-processing part 12 reads the exposure condition and makes the digital printer 18 use the readout condition as an initial condition, so that the printer can work at a high speed. And, when additional copies of a picture are taken, the magnetic information is also used so that the printer can work at a high speed.

Moreover, the order information, which is recorded in the magnetic record layer of the film, is saved in an inner storage medium (for example, a flash memory) of the player 30, and the new information is written in the magnetic record layer of the film, as a result, a new order can be made. And, the previous information is saved in the player 30, so the information on trimming, zooming, letters, etc. can be used for reference or another order.

As has been described above, the laboratory system of the present invention uses the digital image data which is transmitted to the digital printer from the high-performance reader in the laboratory system, and writes the digital image data in the outer storage medium in accordance with the user's requirements for the digital image data. As a result, the user can get a high-quality digital image data at a low cost. And, he can also get a high-grade and low-cost print service from a laboratory.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A laboratory system comprising:

development means for developing a still photographic film;

image reading means for picking up an image from the still photographic film developed by said development means and converting said image into digital image data;

a digital printer for printing a film image from the digital image data provided by said image reading means;

writing means for writing data in a portable storage medium; and pre-processing means for directing said writing means to write the digital image data provided by said image reading means in said portable storage medium when there is a requirement for the digital image data.

2. The laboratory system according to claim 1, wherein information concerning photographing and order in each frame are recorded in said portable storage medium, said pre-processing means comprising:

reading means for reading said information from said portable storage medium, said pre-processing means controlling at least one of said development means, said image reading means and said digital printer in accordance with said information.

3. The laboratory system according to claim 1, wherein the still photographic film has a magnetic record layer in which information concerning photographing and order in each frame are recorded, said pre-processing means comprising:

reading means for reading said information from said magnetic record layer, said pre-processing means controlling at least one of said development means, said image reading means and said digital printer in accordance with said information.

4. The laboratory system according to claim 1, wherein portable storage medium is a storage medium for a personal computer and when there is a requirement for the digital image data, said pre-processing means directs said writing means to write the digital image data provided by said image reading means in said portable storage medium for the personal computer in accordance with a designated format.

5. The laboratory system according to claim 4, further comprising:

reading means for reading the digital image data from said portable storage medium for the personal computer, said pre-processing means directing said digital printer to print the film image in accordance with the digital image data stored in said portable storage medium for the personal computer when there is an order for printing.

6. The laboratory system according to claim 1, wherein the still photographic film has a magnetic record layer, said development means comprising:

record means for recording information concerning an exposure condition for development in said magnetic record layer, said pre-processing means including reading means for reading the information concerning an exposure condition from said magnetic record layer, said pre-processing means directing said digital printer to use the readout information concerning an exposure condition as an initial condition of re-printing.

7. A method of processing still photographic film comprising the steps of:

(a) developing the still photographic film;

(b) imaging the developed still photographic film and converting the imaged still photographic film into digital image data;

(c) printing a film image from the digital image data; and (d) writing the digital image data in a portable storage medium when there is a requirement for the digital image data.

8. The method of processing still photographic film of claim 7, wherein information concerning photographing and order in each frame are previously recorded in the portable storage medium, the method of processing still photographic film further comprising the steps of:

(e) reading the information from the portable storage medium; and (f) controlling steps (a), (b) and (c) in accordance with the information.

9. The method of processing still photographic film of claim 7, wherein the still photographic film has a magnetic record layer in which information concerning photographing and order in each frame are previously recorded, the method of processing still photographic film further comprising the steps of:

(e) reading the information from the magnetic record layer; and (f) controlling at least one of said steps (a), (b) and (c) in accordance with the information.

10. The method of processing still photographic film of claim 7, wherein said step (d) comprises writing the digital image data in a personal computer compatible portable storage memory in accordance with a designated format.

11. The method of processing still photographic film of claim 10, further comprising the steps of:

(e) reading the digital image data from the personal computer compatible portable storage memory; and (f) printing the film image in accordance with the digital image data stored in the personal computer compatible portable storage medium when there is an order for printing.

12. The method of processing still photographic film of claim 7, wherein the still photographic film has a magnetic record layer, said step (a) comprising recording information concerning an exposure condition for development in the magnetic record layer, the method of processing still photographic film further comprising the steps of:

(e) reading the information concerning an exposure condition from the magnetic record layer; and (f) reprinting a film image using the read out information concerning an exposure condition as an initial condition.

13. A still photographic film processing system comprising:

development means for developing still photographic film;

imaging means for imaging the developed still photographic film and producing digital image data representative of still images recorded on the still photographic film; and writing means, coupled to said imaging means, for writing the digital image data into a portable storage medium which is removably coupled to said writing means.

14. The still photographic film processing system of claim 13, further comprising printing means, coupled to said imaging means, for printing still images in accordance with the digital image data.

15. The still photographic film processing system of claim 14, wherein the still photographic film has a magnetic record layer, said development means comprising:

recording means for recording exposure information descriptive of development exposure conditions on the magnetic record layer of the still photographic film.

16. The still photographic film processing system of claim 15, further comprising control means for reading the exposure information recorded on the magnetic record layer of the still photographic film and for directing said printing means to print still images in accordance with the exposure information.

17. The still photographic film processing system of claim 14, wherein photographic information descriptive of a photographic operation is previously recorded in said portable storage medium, the still photographic film processing system further comprising:

control means for reading the photographic information recorded in said portable storage medium and for directing operation of at least one of said development means, said imaging means and said printing means in accordance with the read photographic information.

18. The still photographic film processing system of claim 14, wherein photographic information descriptive of a photographic operation is previously recorded on a magnetic record layer of the still photographic film, the still photographic film processing system further comprising:

control means for reading the photographic information recorded on the magnetic record layer of the still photographic film and for directing operation of at least one of said development means, said imaging means and said printing means in accordance with the read photographic information.

19. The still photographic film processing system of claim 13, wherein said portable storage medium is a floppy disk.

20. The still photographic film processing system of claim 13, wherein said portable storage medium is an IC card.

* * * * *